United States Patent [19]

Stakem

[11] Patent Number: 4,948,771
[45] Date of Patent: Aug. 14, 1990

[54] ETHYLENE COPOLYMERIZATION CATALYST

[75] Inventor: Francis G. Stakem, Flemington, N.J.

[73] Assignee: Union Carbide Chemicals and Plastics Company Inc., Danbury, Conn.

[21] Appl. No.: 280,981

[22] Filed: Dec. 7, 1988

[51] Int. Cl.$^5$ .............................................. C08F 4/68
[52] U.S. Cl. .................................... 502/112; 502/120; 502/121; 502/123; 502/125; 502/126; 502/127; 526/129
[58] Field of Search ............... 502/112, 120, 121, 123, 502/125, 126, 127

[56] References Cited

U.S. PATENT DOCUMENTS 3,135,809  6/1964  Bosmajian ...................... 502/114 X
4,508,842  4/1985  Beran et al. ........................ 502/112

*Primary Examiner*—Patrick P. Garvin
*Attorney, Agent, or Firm*—Saul R. Bresch

[57] ABSTRACT

A catalyst composition comprising:
(i) a complex comprised of $V_2X_3(ED)_m$ and $AlCl_2R_2$ wherein
    X = Cl, Br, or I, or mixtures thereof
    ED = an electron donor, which is an ether, a phosphine, a ketone, an isocyanide, or an ester, said electron donor having 2 to 20 carbon atoms
    R = an alkyl having up to 14 carbon atoms
    m = an integer from 3 to 6,
    said complex impregnated into an inorganic oxide support;
(ii) sufficient trialkylaluminum compound adsorbed on the inorganic oxide support to provide a molar ratio of adsorbed trialkylaluminum compound to vanadium of about 2.5:1 to about 10:1;
(iii) a halocarbon promoter; and
(iv) a hydrocarbyl aluminum cocatalyst.

11 Claims, No Drawings

ETHYLENE COPOLYMERIZATION CATALYST

TECHNICAL FIELD

This invention relates to a vanadium catalyst useful in ethylene copolymerization.

BACKGROUND ART

A number of vanadium catalysts have been described in the literature based on species such as $VCl_4$, $VCl_3$, $VOCl_3$, and vanadyl tris-acetylacetonate. Impregnated on or chemically anchored to supports such as silica, these catalysts provide ethylene copolymers with a broad molecular weight distribution and certain desirable properties. However, these catalyst systems are plagued by several problems, among them, low activity. Recently vanadium catalysts have come to the fore in ethylene copolymer production because of the discovery of a particular catalyst composition, which is singularly effective in gas phase processes. The advantages of this catalyst composition are superior hydrogen response thus achieving very low levels of unsaturation; a high degree of productivity resulting in very low catalyst residues; and the production of ethylene copolymers having a relatively broad molecular weight distribution and a wide melt index range. Further, it permits (i) the utilization of a broad range of comonomers, which enables the production of a wide range of densities; (ii) a high level of incorporation of comonomers into the copolymer structure; and (iii) a more random distribution of the comonomers in that structure. It also provides polymers having high bulk densities and readily fluidizable particle sizes low in fines and substantially free of agglomeration. The particular catalyst composition referred to comprises (i) the reaction product of a vanadium trihalide and an electron donor, which together with a modifier are impregnated onto a silica support; (ii) a halocarbon promoter; and (iii) a hydrocarbyl aluminum cocatalyst.

A major problem with this composition arises, however, in connection with the manufacture of copolymers from more than two comonomers. For example, under the low temperature polymerization conditions used in the preparation of ethylene/propylene/ethylidene norbornene terpolymer rubber, the third comonomer, ethylidene norbornene, severely reduces the activity of this usually effective catalyst.

DISCLOSURE OF THE INVENTION

An object of the invention, therefore, is to provide a catalyst, which is generally useful in the production of ethylene based copolymers and will exhibit exemplary activity in the copolymerization of ethylene with two or more comonomers. Other objects and advantages will become apparent hereinafter.

According to the present invention, then, a vanadium catalyst has been discovered which meets the above object. The catalyst comprises:

(i) a complex comprised of $V_2X_3(ED)_m$ and $AlCl_2R_2$ wherein

X = Cl, Br, or I, or mixtures thereof
ED = an electron donor, which is an ether, a phosphine, a ketone, an isocyanide, or an ester, said electron donor having 2 to 20 carbon atoms
R = an alkyl having up to 14 carbon atoms
m = an integer from 3 to 6, said complex impregnated into an inorganic oxide support;
(ii) sufficient trialkylaluminum compound adsorbed on the inorganic oxide support to provide a molar ratio of adsorbed trialkylaluminum compound to vanadium of about 2.5:1 to about 10:1;
(iii) a halocarbon promoter; and
(iv) a hydrocarbyl aluminum cocatalyst.

DETAILED DESCRIPTION

The vanadium complex can be prepared, for example, by the reaction of $VCl_3(THF)_3$ in a THF (tetrahydrofuran) solution with an excess of a trialkylaluminum compound, adding the mixture to silica, and drying the mixture to a free flowing powder. A typical procedure for preparing the complex/excess trialkylaluminum/support component is set forth in Example 1, below.

The complex is comprised of at least one cation and at least one anion. One of the cations can be represented by the formula $V_2X_3(ED)_m$ and one of the anions by the formula $AlCl_2R_2$.

The vanadium precursor can be a vanadium trihalide, a vanadium oxy trihalide, or a vanadium tetrahalide. The halide is either chlorine, bromine, or iodine, or mixtures thereof.

The electron donor is a liquid, organic Lewis base in which the vanadium compound and trialkylaluminum are soluble. It can be selected from the group consisting of alkyl esters of aliphatic and aromatic carboxylic acids, aliphatic ketones, aliphatic amines, alkyl and cycloalkyl ethers, and mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of the vanadium compound, electron donor, and trialkylaluminum, the reaction product finally contains about 1 to about 20 moles of electron donor per mole of vanadium compound and preferably about 1 to about 10 moles of electron donor per mole of vanadium compound. About 3 moles of electron donor per mole of vanadium compound has been found to be most preferable.

As noted, an excess of trialkylaluminum compound is also used. While the atomic ratio of aluminum to vanadium in the complex is about 0.5:1, the molar ratio of trialkylaluminum compound adsorbed on the support to vanadium is in the range of about 2.5:1 to about 10:1 and is preferably in the range of about 3:1 to about 7:1.

Silica is the preferred support. Other suitable inorganic oxides are aluminum phosphate, alumina, silica/alumina mixtures, silica modified with an organoaluminum compound such as triethylaluminum, silica modified with diethylzinc, and a mixture of silica and calcium carbonate. A typical support is a solid, particulate porous material essentially inert to the polymerization. It is used as a dry powder having an average particle size of about 10 to about 250 microns and preferably about 30 to about 100 microns; a surface area of at least about 3 square meters per gram and preferably about 50 square meters per gram; and a pore size of at least about 80 Angstroms and preferably at least about 100 Angstroms. Generally, the amount of support used is that which will provide about 0.05 to about 0.5 millimole of vanadium compound per gram of support and preferably about 0.2 to about 0.3 millimole of vanadium compound per gram of support.

The halocarbon promoter can have the following formula:

wherein
R = hydrogen or an unsubstituted or halogen substituted alkyl having 1 to 6 carbon atoms;
X = a halogen, and each X can be alike or different; and
a = 0, 1, or 2.

Preferred promoters include fluoro-, chloro-, and bromo substituted methane or ethane having at least 2 halogen atoms attached to a carbon atom, e.g., methylene dichloride, 1,1,1-trichloroethane, chloroform, $CBr_4$, $CFCl_3$, hexachloroethane, $CH_3CCl_3$, and $CF_2ClCCl_3$. The first three mentioned promoters are especially preferred. About 0.1 to about 10 moles, and preferably about 0.2 to about 2 moles, of promoter can be used per mole of cocatalyst.

The trialkylaluminum compound can be represented by the formula $R_3Al$ wherein each R is an alkyl; each R can be alike or different; and each R has up to 14 carbon atoms, and preferably 2 to 8 carbon atoms. Further, each alkyl can be straight or branched chain. Examples of suitable alkyls are: methyl, ethyl, propyl, isopropyl, butyl, isobutyl, tert butyl, pentyl, neopentyl, n-hexyl, 2-methylpentyl, heptyl, octyl, isooctyl, 2-ethylhexyl, 5,5-dimethylhexyl, nonyl, decyl, isodedcyl, undecyl, and dodecyl. The cocatalyst can be the same as the foregoing $R_3Al$ except that R can also be aryl.

Examples of suitable hydrocarbyl aluminum compounds are as follows: triisobutylaluminum, tri n-hexylaluminum, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. The preferred trialkylaluminum compounds and hydrocarbyl aluminum compounds are triethylaluminum, triisobutylaluminum, and tri n-hexylaluminum.

The cocatalyst and promoter can be added to the vanadium complex either before or during the polymerization reaction. They can be added together or separately, simultaneously or sequentially. The cocatalyst and promoter are preferably added separately as solutions in an inert solvent, such as isopentane, to the polymerization reaction at the same time as the flow of the comonomers is initiated. The cocatalyst is necessary to obtain any significant polymerization. The promoter, on the other hand, can be considered a preferred option. About 5 to about 500 moles, and preferably about 10 to about 40 moles, of cocatalyst can be used per mole of vanadium catalyst precursor, i.e., the reaction product of the vanadium compound, the electron donor, and the trialkylaluminum.

The polymerization can be conducted in the gas phase or liquid phase using conventional techniques such as fluidized bed, slurry, or solution processes. A continuous, fluidized bed process is preferred. Using this fluidized bed process, the vanadium complex/excess trialkylaluminum/support component, the cocatalyst, the promoter, and comonomers are continuously fed into the reactor and product is continuously removed. The fluidized bed polymerization is conducted at a temperature below the sintering temperature of the product. The operatinq temperature is generally in the range of abut 10° C. to about 115° C. The fluidized bed reactor is typically operated at pressures of up to about 1,000, and preferably about 50 to about 350, psig. A chain transfer agent, such as hydrogen, can be used to terminate the polymer chain. Usually the ratio of hydrogen to ethylene will vary between about 0.001 to about 0.1 mole of hydrogen per mole of ethylene.

Subject catalyst can be used in the polymerization of at least one alpha olefin havinq 2 to 20 carbon atoms. It is particularly useful in the production of copolymers in which a major proportion, i.e., more than 50 percent by weight, is based on ethylene, propylene, and/or butene comonomers. It is understood that the term "copolymer" includes polymers having two or more different comonomers incorporated into the same polymer chain. The balance of the copolymer is attributed to various alpha olefins or diolefins having 2 to 20 carbon atoms, which are present in minor proportion. Examples of the alpha olefins and diolefins are 4-methyl-1-pentene, 1-hexene, 1-octene, 1,4-hexadiene, and dicyclopentadiene. Of particular interest are ethylene/propylene rubbers and ethylene/propylene/ethylidene norbornene rubbers.

The invention is illustrated by the following examples.

EXAMPLE 1

Preparation of the vanadium complex/excess trialkylaluminum/support component:

3.0 millimoles of $VCl_3$, dissolved in freshly distilled tetrahydrofuran (THF) is placed in a 200 milliliter flask and blanketed with nitrogen. The solution is stirred at room temperature and 18 millimoles of trimethylaluminum in hexane are added via syringe. The resulting deep violet solution is stirred at 45° C. for 30 minutes. During this time, the solution turns green, indicative of the vanadium +2 species. 10.0 qrams of silica (dried at 600° C.) is added and the slurry is dried down at 45° to 50° C. under vacuum for 2 hours. Analysis shows 0.26 millimole vanadium per gram of catalyst and a THF/V mole ratio of 5.5:1.

EXAMPLE 2

A one liter autoclave reactor is heated to 110° C. and purged with nitrogen for 30 minutes. After cooling to 45° C., 500 milliliters of dry, deaerated hexane are added. 0.8 millimole of triethylaluminum, 0.8 millimole of $CHCl_3$ promoter, and the catalyst precursor (0.02 millimole of vanadium) prepared in example 1 are added next. Then, 10 milliliters of ethylidene norbornene, 1.5 psi of hydrogen, and 7 grams of propylene are charged to the reactor. The reactor is pressurized with 130 psi of ethylene and heated to 65° C. with stirring. Ethylene is fed continuously and the polymerization is continued for one hour. The reactor is vented and the contents poured into isopropanol, stirred in a high speed blender, and filtered. The resulting resin is in a granular form and is dried overnight under vacuum in a 65° C. oven. Comonomer content is determined by nuclear magnetic resonance analysis. The variables and results for Examples 2 through 6 are given in the Table.

EXAMPLE 3

Example 2 is repeated except that triethylaluminum is substituted for trimethylaluminum in example 1.

EXAMPLE 4

Example 2 is repeated except that 4 millimoles of trimethylaluminum are used in example 1.

EXAMPLE 5

Example 2 is repeated except that triisobutylaluminum is substituted for trimethylaluminum in example 1.

EXAMPLE 6

Example 2 is repeated except that tri-nhexylaluminum is substituted for trimethylaluminum in example 1.

EXAMPLE 7

Example 2 is repeated except that the catalyst is prepared in the same manner as the catalyst used in Example 1 of U.S. Pat. No. 4,508,842, issued on Apr. 2, 1985, incorporated by reference herein.

TABLE

| Example | Al/V | Component (iv) | Activity | % Propylene | % ENB |
|---------|------|----------------|----------|-------------|-------|
| 2 | 6 | TMA | 2536 | 4.1 | 1.1 |
| 3 | 6 | TEAL | 2513 | 5.1 | 2.0 |
| 4 | 4 | TMA | 1300 | — | — |
| 5 | 6 | TIBA | 2200 | — | — |
| 6 | 6 | TNHAL | 2337 | — | — |
| 7 | 4.5 | DEAC | 870 | 4.3 | 0.5 |

Notes with respect to the Table:
1. Al/V is the molar ratio of excess trialkylaluminum compound adsorbed on the support to vanadium.
2. The activity of the catalyst is measured in grams of ethylene/propylene/ethylidene norbornene terpolymer per millimole of vanadium per hour.
3. % Propylene is the percent by weight of the terpolymer attributed to the propylene monomer (analyzed by NMR).
4. % ENB is the percent by weight of the terpolymer attributed to the ethylidene norbornene monomer (analyzed by NMR).
5. NMR = nuclear magnetic resonance.
6. TMA = trimethylaluminum.
7. TEAL = triethylaluminum.
8. TIBA = triisobutylaluminum.
9. TNHAL = tri-n-hexylaluminum.
10. DEAC = diethylaluminum chloride.

EXAMPLE 8

The product of reduction of $VCl_3$ with trimethylaluminum is isolated as a green solid, dissolved in THF, and deposited on silica. No excess aluminum alkyl is present. Extraction with THF shows only 9 mole percent of the vanadium is adsorbed on the surface of the silica. A polymerization test of the catalyst according to Example 2 gives an activity of 868.

EXAMPLE 9

A catalyst is prepared as in Example 8 except that the silica is pretreated with triethylaluminum to react surface hydroxy moieties. Extraction shows 39 mole percent of the vanadium to be adsorbed on the surface of the silica. A polymerization test of this catalyst according to Example 2 gives an activity of 1045.

EXAMPLE 10

A catalyst prepared as in Example 1 is extracted with THF. 49 mole percent of the vanadium is not extracted. A polymerization test of the catalyst according to Example 2 gives an activity of 2263.

EXAMPLE 11 AND 12

A fluidized bed reactor is operated as described in U.S. Pat. No. 4,508,842 employing the catalysts used in Examples 2 and 7. The objective is the preparation of ethylene/propylene/diene terpolymer (EPDM).

The reaction conditions and results are as follows:

| Example | 11 | 12 |
|---------|-----|-----|
| Catalyst | Example 1 | Example 7 |
| temperature (°C.) | 40 | 40 |
| propylene/ethylene mole ratio | 0.41 | 0.37 |
| ethylene (psi) | 126 | 123 |
| cocatalyst | TIBA | TIBA |
| promoter | $CHCl_3$ | $CHCl_3$ |
| ethylidene norbornene (ENB) (bed wt. %) | 7.4 | 6.3 |
| propylene (wt. %) | 26.8 | 29.5 |
| ENB (wt. %) | 3.5 | 4.9 |
| Ash (wt. %) | 0.177 | 0.334 |
| g/g cat. | 707 | 286 |

Notes:
1. psi = pounds per square inch.
2. TIBA = triisobutylaluminum.
3. ethylidene norbornene (bed wt. %) = the percent by weight of ethylidene norbornene based on the weight of the fluidized bed.
4. propylene (wt. %) = the percent by weight of propylene based on the weight of the EPDM.
5. ENB (wt. %) = the percent by weight of ethylidene norbornene based on the weight of the EPDM.
6. ash (wt. %) = the percent by weight of ash based on the weight of the EPDM.
7. vanadium (ppm) = parts per million by weight of vanadium based on the weight of EPDM.
8. g/g cat. = grams of EPDM produced per gram of supported vanadium catalyst.

EXAMPLES 13 AND 14

Examples 11 and 12 are repeated except that the objective is the preparation of linear low density polyethylene (LLDPE).

The reaction conditions, which differ from examples 11 and 12, and the results are as follows:

| Example | 13 | 14 |
|---------|-----|-----|
| temperature (°C.) | 90 | 90 |
| 1-hexene/ethylene mole ratio | 0.043 | 0.049 |
| hydrogen/ethylene mole ratio | 0.0191 | 0.0155 |
| ethylene (psi) | 138 | 141 |
| cocatalyst | TEAL | TEAL |
| melt index | 0.39 | 0.30 |
| melt flow ratio | 99 | 92 |
| density (g/cc) | 0.9293 | 0.9250 |
| vanadium (ppm) | 6.79 | 7.43 |
| ash (wt %) | 0.049 | 0.053 |
| productivity (lb/lb/ catalyst) | 1915 | 1750 |

Notes (also see Notes for Examples 11 and 12):
1. TEAL = triethylaluminum.
2. melt index, melt flow ratio, and density = see U.S. Pat. No. 4,508,842 for definitions.
3. productivity (lb/lb catalyst) = pounds of LLDPE produced per pound of catalyst added to the reactor.

I claim:

1. A catalyst composition comprising:
(i) a complex comprised of $V_2X_3(ED)_m$ and $AlCl_2R_2$ wherein
   X = Cl, Br, or I, or mixtures thereof
   ED = an electron donor, which is an ether, a phosphine, a ketone, an isocyanide, or an ester, said electron donor having 2 to 20 carbon
   R = an alkyl having up to 14 carbon atoms
   m = an integer from 3 to 6, said complex impregnated into an inorganic oxide support;

(ii) sufficient trialkylaluminum compound adsorbed on the inorganic oxide support to provide a molar ratio of adsorbed trialkylaluminum compound to vanadium of about 2.5:1 to about 10:1;

(iii) a halocarbon promoter; and (iv) a hydrocarbyl aluminum cocatalyst.

2. The catalyst composition of claim 1 wherein the electron donor is an alkyl ester of an aliphatic or an aromatic carboxylic acid, an aliphatic ketone, an an alkyl or cycloalkyl ether, or mixtures thereof.

3. The catalyst composition of claim 1 wherein the trialkylaluminum compound is trimethylaluminum.

4. The catalyst composition of claim 1 wherein the trialkylaluminum compound is triethylaluminum.

5. The catalyst composition of claim 1 wherein the trialkylaluminum compound is triisobutyl aluminum.

6. The catalyst composition of claim 1 wherein the trialkylaluminum compound is tri n-hexylaluminum.

7. The catalyst composition of claim 1 wherein the cocatalyst is triisobutyl aluminum.

8. The catalyst composition of claim 1 where the cocatalyst is triethylaluminum.

9. The catalyst composition of claim 1 wherein the promoter is $CHCl_3$ or $CFCl_3$.

10. The catalyst composition of claim 1 wherein the molar ratio of adsorbed trialkylaluminum to vanadium is about 3:1 to about 7:1.

11. The catalyst composition of claim 1 wherein component (ii) is prepared with excess trialkylaluminum compound.

* * * * *